(12) United States Patent
Clark

(10) Patent No.: US 6,769,726 B1
(45) Date of Patent: Aug. 3, 2004

(54) TRUCK MOUNTED ADVERTISING SYSTEM

(76) Inventor: Patrick Frank Clark, 3505 Chapel Dr., Sarasota, FL (US) 34234

(*) Notice: Subject to any disclaimer, the term of this patent is extended or adjusted under 35 U.S.C. 154(b) by 0 days.

(21) Appl. No.: 10/641,901

(22) Filed: Aug. 18, 2003

(51) Int. Cl.⁷ .............................. B60R 13/00; B60P 3/18
(52) U.S. Cl. ........................... 296/21; 40/564; 40/549; 40/545; 40/575
(58) Field of Search .............................. 296/21; 40/541, 40/549, 564, 575, 545

(56) References Cited

U.S. PATENT DOCUMENTS

| 3,802,103 A | 4/1974 | Neff |
|---|---|---|
| 3,935,654 A | 2/1976 | Rubin |
| 4,135,754 A * | 1/1979 | FitzGerald et al. ........... 296/15 |
| 5,649,730 A | 7/1997 | Ramos |
| 6,036,250 A | 3/2000 | Glatter |
| 6,379,209 B1 * | 4/2002 | Tucker ........................ 445/24 |

* cited by examiner

Primary Examiner—Joseph D. Pape
(74) Attorney, Agent, or Firm—Charles W. Chandler

(57) ABSTRACT

An illuminated sign display is mounted on a truck or trailer sidewall. The display includes a four sided frame with one of the frame sides being hinged so that it can be opened to receive an advertising sheet, between a front clear plastic sheet for protecting the advertising sheet, and a rear white translucent sheet. The display also includes a white metal back sheet adjacent the truck wall and an illumination device mounted between the white metal back sheet and the white translucent sheet in a chamber formed between the two.

2 Claims, 2 Drawing Sheets

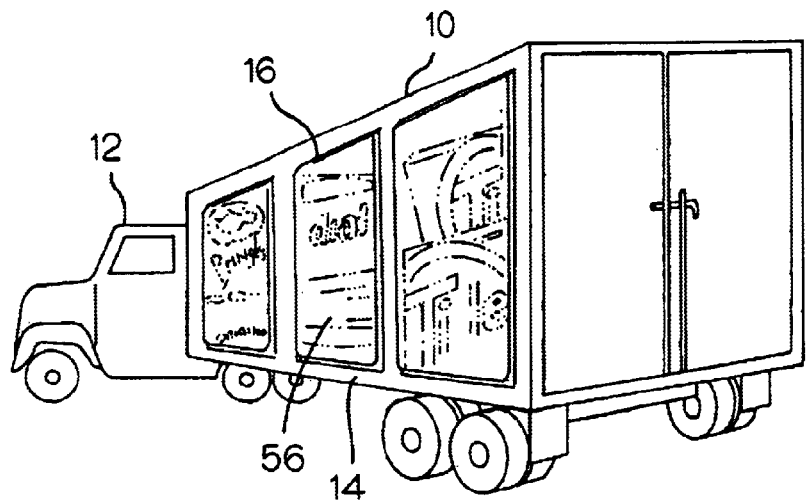
FIG.1
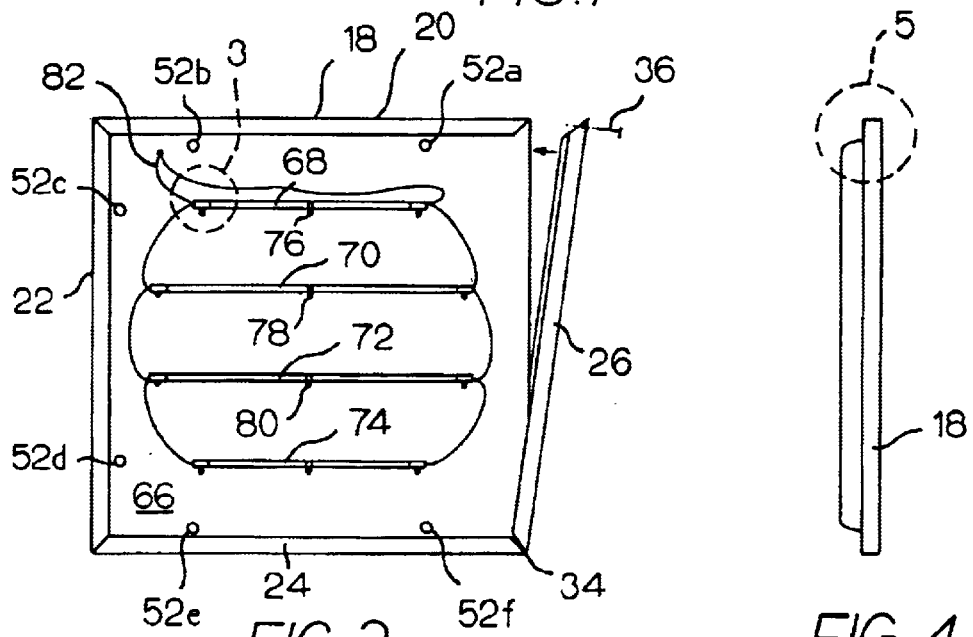
FIG.2
FIG.4
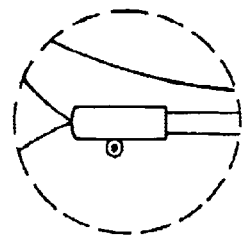
FIG.3
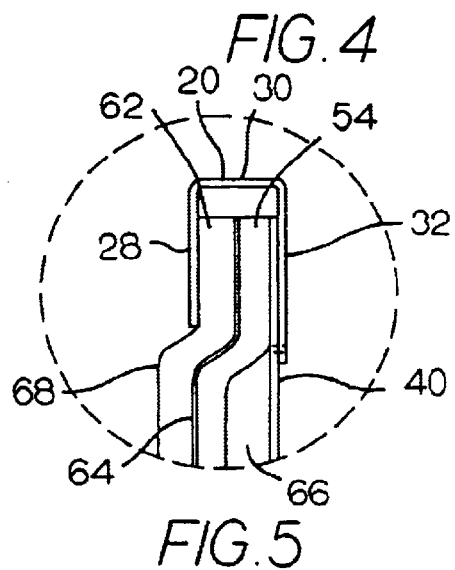
FIG.5

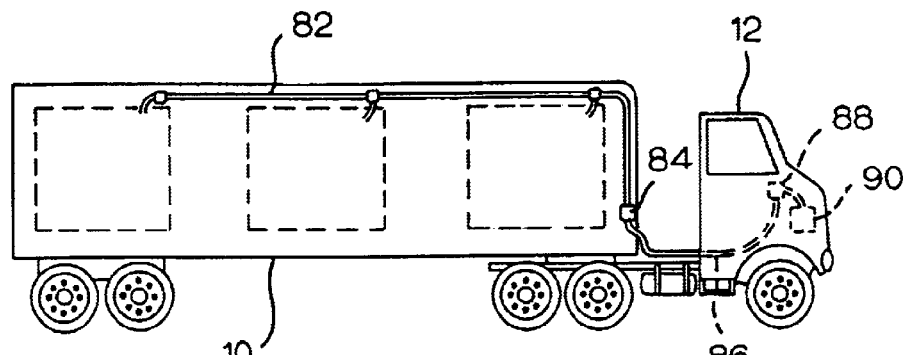
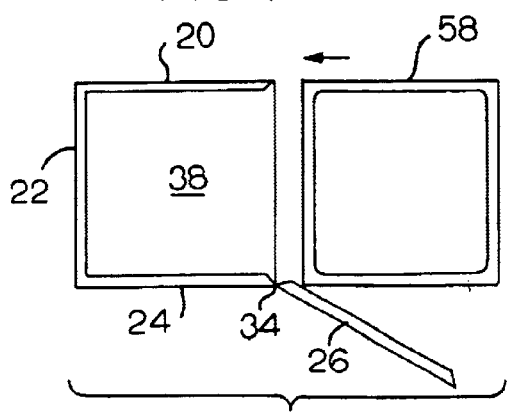
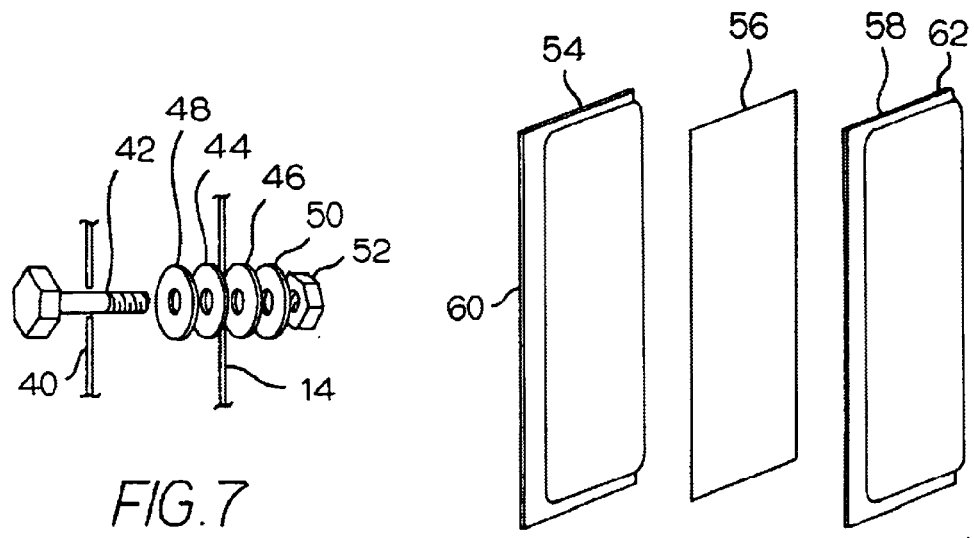

TRUCK MOUNTED ADVERTISING SYSTEM

BACKGROUND AND SUMMARY OF THE INVENTION

This invention is concerned with a means for illuminating an advertising sign on the side of a truck having a vertical sidewall. This may include trailers and trucks of different sizes. The sign uses a low glow neon lighting so as not to distract other drivers. Neon tubes can withstand rough terrain bumps and are long lasting lights. The sign may be used, for example, on semi-trailers with sponsors, local business vehicles, and corporations with the logo on the trailers.

The sign system is connected to a switch on the dashboard of the vehicle so that the driver can turn it on at dusk and off at daylight, and also to meet any city restrictions.

Advertising signs on the sides of vehicles, such as trucks, are known in the art. They included U.S. Pat. Nos. 6,036,250 issued Mar. 14, 2000 to Charles Glitter for "Trailer for Reducing Boundry Layer Normal-Pressure Drag Thereon"; 5,649,730 issued Jul. 1997 to Raul A. Ramos for "Dump Truck Advertising System"; 3,935,654 issued Feb. 3, 1976 to Irene E. Rubin for "Illuminated Vehicular Display Sign"; and 3,802,103 issued Apr. 9, 1974 to Lee M. Neff for "Sign".

The preferred sign has a four-sided frame. Each side has a channel-shaped configuration with the channel sidewalls mounted parallel to the truck wall. One of the frame sides is hinged so that it can be opened to receive an advertising sheet, between a front clear plastic sheet for protecting the advertising sheet, and a rear white translucent sheet. The frame can be opened to readily change the advertising signs in a central display area.

The back sheet is white metal and is adjacent the truck wall. The illumination device is mounted between the white metal back sheet and the white translucent sheet in a chamber formed between the two. The illumination device is connected by electrical conductors to a switch in the driver's compartment. The illumination components are preferably neon lights sealed in water-resistant, high-impact, acrylic tubes with a built-in transformer and sold as LITEGLOW UNDERCAR KITS. Preferably the switch in the driver's compartment is of the type that illuminates the sign under dark conditions, and is turned off during normal daytime hours.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a view of a tractor trailer assembly having three signs illustrating the invention mounted on each side of the trailer;

FIG. 2 is a view of the sign assembly with the front panels removed to show the electrical system;

FIG. 3 is an enlarged view of a night glow illumination system;

FIG. 4 is a side view of the preferred sign;

FIG. 5 is an enlarged fragmentary view showing how the panels are retained within the sign frame;

FIG. 6 is a side view of a trailer showing the electrical system;

FIG. 7 is a view showing a typical fastener system for connecting the sign to the trailer;

FIG. 8 is an exploded view of two panels and an advertising sheet; and

FIG. 9 is a view showing one of the panels being introduced through the slot in the sign frame.

DESCRIPTION OF THE PREFERRED EMBODIMENTS

Referring to the drawings, FIGS. 1 and 6 illustrate a trailer 10 pulled by a truck 12. Trailer 10 is illustrated for illustrative purposes, but the invention can be mounted on any type of vehicle having a relatively large vertical wall, such as wall 14. A sign assembly 16 is mounted on wall 14. In this case, three sign assemblies are mounted showing different advertisements.

Referring to FIGS. 1 and 9, the sign assembly includes a four-sided frame 18 which may take any suitable size but is preferably about 6' by 6'. The frame assembly includes four extruded frame side elements 20, 22, 24 and 26. Each side element has a channel-shaped configuration, as illustrated in FIG. 5, with an inner channel side 28 extending inwardly from base 30 and a longer deeper side 32. As viewed in FIG. 2, the left-end of side 20 is attached to side 22 by any suitable means such as by welding. Similarly, the opposite end of side 22 is attached to side 24. Side 26 is attached to the opposite end of side 24 by a hinge 34 so that side 26 can be swung downwardly as illustrated in FIG. 9. When fully closed the upper end of side 26 is attached by a threaded fastener 36 to side 20. When closed, the four sides form an enclosed viewing area 38.

Referring to FIGS. 5 and 8, a white four-sided metal back panel 40 is slightly larger than the distance between the opposed frame channels, and is mounted on the long sidewall 32 of each of the channels. Thus back panel 40 overlaps the outer sidewall of the four frame channels and is mounted on their inner side. Sheet 40 is then attached by fasteners which pass through sidewall 32 of the channels, as illustrated in FIGS. 5 and 7. Each fastener includes a screw 42, a pair of rubber washers 44 and 46 and a pair of metal washers 48 and 50. The rubber and metal washers are mounted in pairs on opposite sides of the trailer wall, and the assembly is then fastened together by a nut 52. The fastener assembly as illustrated in FIG. 7 is mounted in six locations illustrated at 52*a*, 52*b*, 52*c*, 52*d*, 52*e*, and 52*f*.

The sign assembly also includes an inner translucent white panel 54, a vinyl advertising sheet 56, and an outer clear plastic panel 58. Inner panel 54 has a lip 60 extending around the four sides of the panel as illustrated in FIGS. 5 and 8. Lip 60 is received within the channel of each of the four frame sides. Its width and height corresponds to the width and height of back panel 40. Similarly, front panel 58 has a peripheral lip 62 extending around the four sides of the panel and received within each of the four frame side elements. The front panel 62 has a height and width that corresponds to that of back panel 40.

Still referring to FIG. 5, panel 54 has a central body 64 offset from back panel 40 to form an illumination chamber 66. Similarly outer clear panel 62 has a central body 68 also offset in a manner similar to panel 54. Advertising sheet 56 is sandwiched between the offset central bodies of the back and outer panels.

When frame side 26 is open, it forms a slot between the opposed upper and lower frame channels 20 and 24 for receiving panel 54, the advertising sheet and dear panel 58, as illustrated in FIG. 9. When the two panels and the advertising sheet are fully received within the frame, frame side 26 is then closed and fastened into position by fastener 36.

Referring to FIG. 2, LITEGLOW tubes 68, 70, 72, 74 are attached to back panel 40 by fasteners 76, 78, and 80. Each light tube has a neon, sealed, water-resistant, high impact, optical, acrylic tube with a built-in transformer. These come in a variety of colors. Assuming that three advertising frames are mounted on trailer sidewall 14, electrical conductor means 82 connects each of the frames to a junction box 84 which is connected to the advertising frame assemblies on both sides of the truck. Electrical conductor 86 then connects the junction box to a dashboard switch 88 and a battery 90.

Preferably switch 88 is of the type that senses the level of lighting in such a manner that when the truck is in a dark area at night, the advertising signs are illuminated. However, if there is sufficient ambient illumination, the illumination is de-energized.

Thus I have described a novel advertising display for the side of a vehicle which is easy to change the advertising material, and provides an attractive but attention-getting advertising display.

Having described my invention, I claim:

1. A vehicle mounted advertising system, comprising:

a vehicle having a vertical, planar wall;

a rigid multi-sided frame, and means for attaching the frame to the vehicle wall, the frame having a first frame side, and means for hingedly connecting said first frame side to another frame side so as to be movable between an open position providing a sign panel receiving opening, and a closed opening in which the multi-sided frame forms a multi-sided display area, the frame sides each having a channel-shaped configuration including a first channel sidewall and a second channel sidewall, parallel with respect to the first channel sidewall;

a white metal back panel slidable into said channel-shaped frame sides closely adjacent the vehicle wall;

a white plastic planar sheet having a body slidable into the frame, the white plastic sheet having a peripheral lip offset from the body of the white plastic sheet such that the body of the white plastic sheet is spaced from the back panel and forms a chamber therebetween;

a front clear plastic sheet having a planar central body and a peripheral lip offset from the central body thereof, the lip being receivable in the channels of opposed frame sides;

an advertising sheet disposed between the bodies of the white plastic sheet and the clear plastic sheet so as to be viewable through the clear plastic sheet in the display area of the frame;

illumination means disposed in said chamber; and a source of electrical power comprising a battery and conductor means for electrically connecting the battery to the illumination means.

2. A vehicle mounted advertising system, comprising:

a rigid multi-sided frame, and means for attaching the frame to a vertical wall of a vehicle, the frame having a first frame side, and means for hingedly connecting said first frame side to another frame side so as to be movable between an open position providing a sign panel receiving opening, and a closed opening in which the multi-sided frame forms a multi-sided display area, the frame sides each having a channel-shaped configuration including a first channel sidewall and a second channel sidewall, parallel with respect to the first channel sidewall;

a white metal back panel slidable into said channel-shaped frame sides closely adjacent the vehicle wall;

a white plastic planar sheet having a body slidable into the frame, the white plastic sheet having a peripheral lip offset from the body of the white plastic sheet such that the body of the white plastic sheet is spaced from the back panel and forms a chamber therebetween;

a front clear plastic sheet having a planar central body and a peripheral lip offset from the central body thereof, the lip being receivable in the channels of opposed frame sides;

an advertising sheet disposed between the bodies of the white plastic sheet and the clear plastic sheet so as to be viewable through the clear plastic sheet in the display area;

illumination means disposed in said chamber, and a source of electrical power comprising a battery and conductor means for electrically connecting the battery to the illumination means.

* * * * *